J. LEE.
SCREW INSERTER AND REMOVER.
APPLICATION FILED DEC. 10, 1910.
1,013,500.
Patented Jan. 2, 1912.
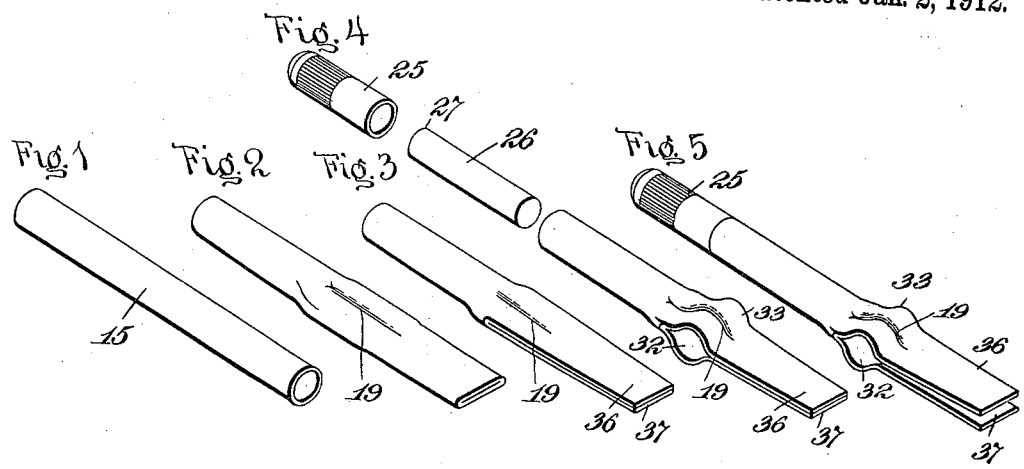
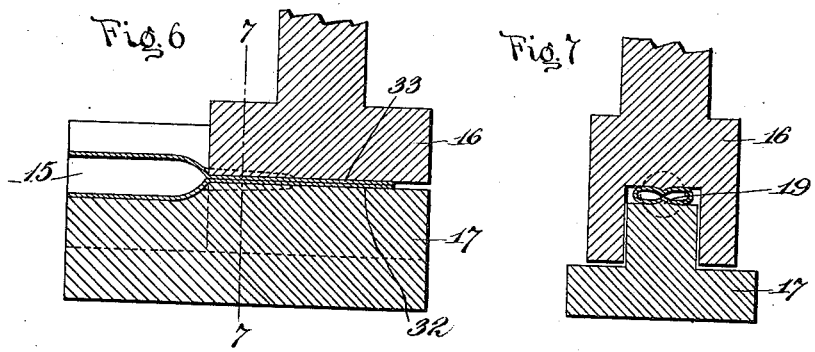
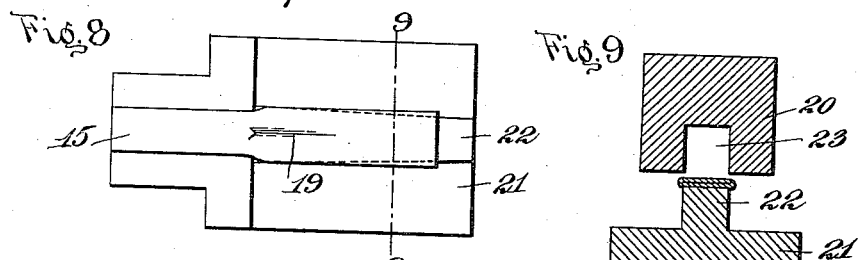
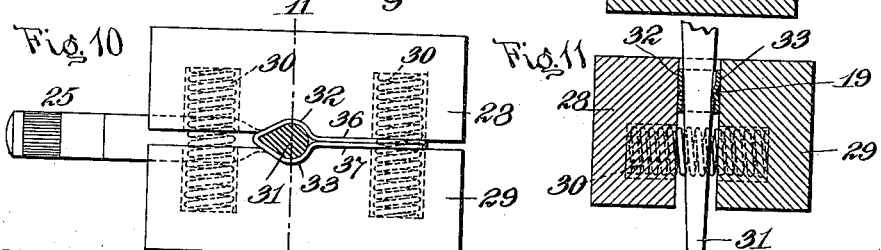
Witnesses:
Inventor
Joseph Lee
By Dyer Dyer & Taylor
Attorneys.

UNITED STATES PATENT OFFICE.

JOSEPH LEE, OF BROOKLYN, NEW YORK.

SCREW INSERTER AND REMOVER.

1,013,500.  Specification of Letters Patent.  Patented Jan. 2, 1912.

Application filed December 10, 1910. Serial No. 596,616.

*To all whom it may concern:*

Be it known that I, JOSEPH LEE, a subject of the King of England, residing in the borough of Brooklyn, county of Kings, and State of New York, have invented a new and useful Screw Inserter and Remover, of which the following is a specification.

My invention relates to a tool to be used for holding screws and inserting them in locations where they cannot be inserted by hand, and also for removing screws from such locations.

My object is to produce a tool of this kind, which will be simple and cheap in construction, and effective and durable in use.

My new and improved tool and the advantages thereof can best be appreciated after its mode of manufacture is understood, and in the accompanying drawings and in the following description, therefore, I have set forth the manner in which said tool may be commercially manufactured.

In the drawings, Figure 1 shows a length of metal tube from which the body portion of the tool is formed; Figs. 2, 3 and 4 show the tool at various steps in its manufacture; Fig. 5 shows the complete tool; Fig. 6 is a side sectional elevation through a die which presses the tube shown in Fig. 1 to the form shown in Fig. 2; Fig. 7 is a sectional elevation on the line 7—7 of Fig. 6; Fig. 8 is a plan view of the anvil member of a die which shears off the edges of the flattened portion of the tube shown in Fig. 2, leaving it in the form shown in Fig. 3; Fig. 9 is a sectional elevation on the line 9—9 of Fig. 8, showing both members of the die; Fig. 10 shows a vise for holding the tool while certain bow springs are formed in it, the tool being shown, and a spreading wedge being illustrated in cross-section; Fig. 11 is a sectional elevation on the line 11—11 of Fig. 10; and Fig. 12 illustrates the manner in which the nibs of the tool are spread.

In the manufacture of my screw inserter and remover I use tubular stock, preferably of soft drawn steel, cut up in suitable lengths, as indicated in Fig. 1 by the character 15. The first step in the manufacture of the tool will be understood from reference to Figs. 2, 6 and 7. In Figs. 6 and 7 one member of a die is shown at 16, and a coöperating member at 17. The form of the coöperating faces of these die members will be readily understood from the drawing, it being noted that the left end of die member 17, as viewed in Fig. 6, is provided with a cylindrical grooved portion in which one end of the tube rests, while the right side of the die members 16 and 17 coöperate to flatten the end of the tube 15. The coöperating faces of the die members at the point indicated by the dotted lines in Fig. 6, are shaped in the manner indicated in Fig. 7, so that the tube will have formed in it longitudinally extending grooves shown at 19 in Fig. 2. After removal from the die shown in Figs. 6 and 7, the tool blank is placed in the die illustrated in Figs. 8 and 9, and the edges of the flattened portion are sheared off. In Figs. 8 and 9 one member of the die is indicated at 20 and the coöperating portion at 21. The forms of these die members 20 and 21 are indicated in the drawing, it being understood that the die member 21 is provided at the left end, as viewed in Fig. 8, with a groove which receives the rounded portion of the tool blank 15, and at its right end with a rib 22, the upper surface of which conforms to the flattened surface of the tool blank. The rib 22 is made converging at one end, as shown in Fig. 8, to greater or less extent according to the shape and width which it is desired the end of the tool shall have, and the upper member 20 of the die is provided with a groove 23 which coöperates with the rib 22. It is obvious that when a tool blank is placed between the die members 20 and 21 and said members are brought together, the edges of the flattened portion of the blank will be sheared off on the dotted lines in Fig. 8, leaving it in the form shown in Fig. 3. The tool blank may now be provided with any suitable handle. As shown in Fig. 4, the handle may take the form of a knurled cap 25 which may be attached to the tool blank through the medium of a pin 26, of such a size that one end of it can be forced into the hole in the cylindrical end of the tool blank, while the other end 27 of the pin receives the knurled cap 25. This form of handle is especially adapted for small tools. The next step in the manufacture of my tool is illustrated in Figs. 10 and 11. The tool blank, in the form shown in Fig. 3, and after being provided with a handle, is clamped in a vise having jaws 28 and 29, which may be forced together in any suitable way and may be given a tendency to move to a spread position by springs 30 embedded in the jaws 28 and 29. The cooperating faces of the jaws 28 and 29, at their left end as viewed in Fig. 10, have grooves which conform to the cylindrical and tapered portions of the tool blank, while the right ends of said jaws are flat at their coöperating faces and engage with the flattened portions of said tool blank. Formed in that portion of the vise jaws adjacent the partially flattened and grooved portion of the tool blank, are grooves of the form shown in Figs. 10 and 11, which permit the spreading of the leaves of the tool blank when a spreading tool 31 is driven or otherwise forced downwardly between said leaves, in the manner shown in Figs. 10 and 11. By means of the vise jaws 28 and 29 and the spreading tool 31, therefore, the tool blank is provided with the bow spring portions 32 and 33, as shown in Fig. 4 in the drawing and certain of the other figures. The final step in the forming of the tool is illustrated in Fig. 12, in which a wedge 35 is shown forced between the nibs 36 and 37, in order to spread them slightly. The spreading of the nibs 36 and 37 may be made to extend either merely from the inner end 38 of said nibs, or may, if desired and as shown in Fig. 12, also go back to the point 39 at the beginning of the split portion of the tool blank.

Fig. 5 shows the tool as completely formed, after which it may be tempered, polished, and nickel-plated or finished in any other desired manner.

When it is desired to use the tool for inserting or removing a screw, the nibs 36 and 37 are pressed together and inserted in the slot of the screw, whereupon the pressure of the nibs outwardly against the sides of the slot will hold the screw firmly in line with the tool.

From the foregoing it will be evident that by using tubular stock I am able to make cheaply a strong light tool. In this tool the spring effect of the nibs 36 and 37 resides in the bow springs 32 and 33, and when the nibs are forced together, the bending of the stock is not concentrated at one point but is spread throughout the bow springs. Repeated use of the tool, therefore, does not create a tendency for the nibs to break off at the body of the tool, and great durability is thus secured. The depressions 19 in the bow spring portions of the tool materially stiffen the bow springs and tend to prevent bending of the tool in use.

Having now described my invention, what I claim as new and desire to secure by Letters Patent, is:—

1. A screw inserter and remover comprising a tubular body portion, two bow springs integral with said body portion and extending from an end thereof and meeting at their free ends, and diverging flat nibs integral with said springs and extending from the free ends thereof and adapted to engage a screw slot, substantially as described.

2. A screw inserter and remover composed of metal tubing having an end flattened and slit along the edges of the flattened portion, and having the leaves thus formed spread near their inner ends into bow springs having longitudinal depressions therein, and at their outer ends spread to form nibs for engaging a screw slot, substantially as described.

3. A screw inserter and remover comprising a body portion of metal tubing, two bow springs extending from one end thereof and having longitudinal depressions therein, and diverging flat nibs extending from said springs, for engaging a screw slot, substantially as described.

4. A screw inserter and remover comprising a body portion of metal tubing, two bow springs having longitudinal depressions therein integral with said tubing and extending from one end thereof, and diverging flat nibs integral with said springs and extending outwardly for engaging a screw slot, substantially as described.

This specification signed and witnessed this seventh day of December, 1910.

JOSEPH LEE.

Witnesses:
 JOHN L. LOTSCH,
 FRANK A. LOTSCH.

---

Copies of this patent may be obtained for five cents each, by addressing the "Commissioner of Patents, Washington, D. C."